Patented Feb. 16, 1926.

1,573,072

UNITED STATES PATENT OFFICE.

PAUL JEAN FREDERIC KESTNER, OF BOULOGNE-SUR-SEINE, FRANCE.

REFRACTORY CEMENT AND CONCRETE.

No Drawing.  Application filed March 12, 1925. Serial No. 15,139.

*To all whom it may concern:*

Be it known that I, PAUL JEAN FREDERIC KESTNER, a citizen of the French Republic, and resident of Boulogne-sur-Seine, France, have invented Improvements in Refractory Cement and Concrete, of which the following is a specification.

This invention relates to the manufacture of refractory cement and concrete, and has particular reference to a new composition of matter constituting a refractory cement which is capable of withstanding high temperatures and which forms an excellent basic material for a concrete for constructing furnaces.

The invention embodies the results of experiments made by me with a view to compounding a cement suitable for constructing or repairing furnaces or parts of furnaces, and my improved refractory cement meets all the requirements of furnace builders and is also suitable for making articles or other structures which have to withstand a high temperature; it sets like Portland cement, and it is capable of withstanding the temperatures ordinarily attained in industrial furnaces without becoming disaggregated or fusing. The ordinary known artificial or natural cements disaggregate and crumble at temperatures less than 500° C. The known cements with a high content of alumina, those for example obtained by fusion of bauxite and limestone, do not crumble but they shrink considerably and crack and fuse at a temperature less than 1500° C.

I have found that by simply mixing a cement having a high content of alumina with calcined bauxite in the form of powder, in proportions which may vary within fairly wide limits, a cement is obtained which sets in less than 24 hours and becomes hard in a few days, does not shrink to any appreciable extent, and withstands without fusing temperatures which may in certain cases reach 1700° C. Besides, the high content of alumina of this cement makes it a refractory substance practically immune from attack by alkaline ashes or slag.

The aluminous cement employed in the manufacture of my improved cement may be, for example, cement obtained by the fusing of bauxite and limestone according to the formula: silica—10 parts, iron oxide—10 parts, alumina—40 parts, and lime—40 parts. This formula is only given as an example; its constitution may vary within fairly wide limits; the essential thing is that the content of alumina should be at least 30%.

The proportion of bauxite to be added to the cement may vary without detriment within the limits of 1 to 10 parts of bauxite to 2 parts of cement; the bauxite need not be in the form of a fine powder; it may even be advantageous that it be constituted by a mixture of fine powder and sand. It must have been previously calcined at a temperature above the point of transformation of alumina.

The cement obtained in this manner may be utilized in various ways; for example, it may be used for repairing broken parts of articles of refractory material or for making refractory articles, difficult to accomplish by the ordinary methods.

A concrete suitable for constructing or repairing furnaces or for making refractory bricks, slabs or the like may be formed by mixing fragments of refractory substances, such as silex or emery, with my refractory cement; and the heat-insulating properties of such concrete, when employed for constructing furnace walls, may be increased by mixing with it particles of combustible material, such as sawdust or coal, the subsequent burning of which will result in the formation of cavities in the mass.

I claim:—

A composition of matter constituting a refractory cement, consisting of a mixture of 1 to 10 parts of bauxite which has been calcined at a temperature above the point of transformation of alumina, and 2 parts of a calcium aluminate cement containing at least 30% of alumina, the said calcined bauxite and calcium aluminate cement being mixed in the form of powder.

In testimony whereof, I have signed this specification.

PAUL JEAN FREDERIC KESTNER.